(12) United States Patent
Harmon

(10) Patent No.: US 10,839,656 B1
(45) Date of Patent: Nov. 17, 2020

(54) COMPUTER-BASED SYSTEMS CONFIGURED FOR MESSAGE TRANSMISSION VIA PHYSICAL VIBRATION

(71) Applicant: Capital One Services, LLC, McLean, VA (US)

(72) Inventor: Eldon Harmon, Lorton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/599,973

(22) Filed: Oct. 11, 2019

(51) Int. Cl.
*G08B 6/00* (2006.01)
*G05D 19/02* (2006.01)

(52) U.S. Cl.
CPC .............. *G08B 6/00* (2013.01); *G05D 19/02* (2013.01)

(58) Field of Classification Search
CPC .................................. G08B 6/00; G05D 19/02
See application file for complete search history.

(56) References Cited

U.S. PATENT DOCUMENTS

| | | | |
|---|---|---|---|
| 2015/0193866 A1* | 7/2015 | Van Heerden | G06Q 40/02 705/35 |
| 2015/0296480 A1* | 10/2015 | Kinsey | H04W 4/80 455/41.3 |
| 2017/0154328 A1* | 6/2017 | Zarakas | G06Q 20/341 |
| 2017/0243452 A1* | 8/2017 | Levesque | G08B 6/00 |
| 2018/0144417 A1* | 5/2018 | Xie | H04M 17/201 |

* cited by examiner

*Primary Examiner* — Yuhui R Pan
(74) *Attorney, Agent, or Firm* — Greenberg Traurig, LLP

(57) ABSTRACT

Systems and methods of message transmission via physical vibrations include, in some embodiments, determining an account activity-related vibration pattern from a set of account activity-related vibration patterns, based on at least one balance-related change in at least one account associated with a user. Generating a vibration encoding based on the account activity-related vibration pattern, where the vibration encoding is configured to be utilized by a vibration motor of at least one computing device, and transmitting the vibration encoding to the computing device associated to cause a vibration motor of the computing device to vibrate in accordance with the account activity-related vibration pattern.

30 Claims, 8 Drawing Sheets

US 10,839,656 B1

COMPUTER-BASED SYSTEMS CONFIGURED FOR MESSAGE TRANSMISSION VIA PHYSICAL VIBRATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF TECHNOLOGY

The present disclosure generally relates to improved computer-based systems configured for one or more novel technological applications of computer-based systems configured for message transmission via physical vibration.

BACKGROUND OF TECHNOLOGY

A computer network system may include a group of computers (e.g., clients, servers, smart routers) and other computing hardware devices that are linked together through one or more communication channels to facilitate communication and/or resource-sharing among a wide range of users.

SUMMARY

In some embodiments, the present disclosure provides a computer-based method that includes at least the following steps of determining, by at least one processor, at least one account activity-related vibration pattern from a set of account activity-related vibration patterns, based, at least in part, on at least one balance-related change in at least one account associated with at least one user. The at least one processor generates at least one vibration encoding based on the at least one account activity-related vibration pattern, where the at least one vibration encoding is configured to be utilized by at least one vibration motor of at least one computing device associated with the at least one user to cause the at least one computing device to vibrate in accordance with the at least one account activity-related vibration pattern. The at least one processor transmits the at least one vibration encoding to the at least one computing device associated with the at least one user to cause the at least one vibration motor of the at least one computing device associated with the at least one user to vibrate in accordance with the at least one account activity-related vibration pattern.

In some embodiments, the present disclosure provides a computer-based method that includes at least the following steps of receiving, by at least one processor of a computing device associated with a user, at least one balance-related change in at least one account associated with the user. The at least one processor determines at least one account activity-related vibration pattern from a set of account activity-related vibration patterns, based, at least in part, on the at least one balance-related change. The at least one processor generates at least one vibration encoding based on the at least one account activity-related vibration pattern, where the at least one vibration encoding is configured to cause at least one vibration motor of the computing device to vibrate in accordance with the at least one account activity-related vibration pattern. The at least one processor causes the at least one vibration motor of the computing device to vibrate in accordance with the at least one account activity-related vibration pattern.

In some embodiments, the present disclosure provides a computer-based system that includes at least the following components of at least one account management processor, where the at least one account management processor is configured to: determine at least one account activity-related vibration pattern from a set of account activity-related vibration patterns, based, at least in part, on at least one balance-related change in at least one account associated with at least one user; generate at least one vibration encoding based on the at least one account activity-related vibration pattern; where the at least one vibration encoding is configured to be utilized by at least one vibration motor of at least one computing device associated with the at least one user to cause the at least one computing device to vibrate in accordance with the at least one account activity-related vibration pattern; and transmit the at least one vibration encoding to the at least one computing device associated with the at least one user to cause the at least one vibration motor of the at least one computing device associated with the at least one user to vibrate in accordance with the at least one account activity-related vibration pattern.

In some embodiments, the present disclosure provides a computer-based method that includes at least the following steps of determining, by at least one processor, at least one account activity-related vibration pattern from a set of account activity-related vibration patterns, based, at least in part, on at least one balance-related change in at least one account associated with at least one user, where each account activity-related vibration pattern of the set of account activity-related vibration patterns includes a number of vibrations. The at least one processor generates at least one vibration encoding based on the at least one account activity-related vibration pattern, where the at least one vibration encoding is configured to be utilized by at least one vibration motor of at least one computing device associated with the at least one user to cause the at least one computing device to vibrate in accordance with the at least one account activity-related vibration pattern. The at least one processor transmits the at least one vibration encoding to the at least one computing device associated with the at least one user to cause the at least one vibration motor of the at least one computing device associated with the at least one user to vibrate in accordance with the at least one account activity-related vibration pattern.

In some embodiments, the present disclosure provides a computer-based method that includes at least the following steps of determining, by at least one processor, at least one account activity-related vibration pattern from a set of account activity-related vibration patterns, based, at least in part, on at least one balance-related change in at least one account associated with at least one user, where each account activity-related vibration pattern of the set of account activity-related vibration patterns includes a number of vibrations. The at least one processor generates at least one vibration encoding based on the at least one account activity-related vibration pattern, where the at least one vibration encoding is configured to be utilized by at least one vibration motor of at least one computing device associated with the at least one user to cause the at least one computing device to vibrate in accordance with the at least one account activity-related vibration pattern. The at least one processor causes, using the at least one vibration encoding, the at least one vibration motor of the at least one computing device associated with the at least one user to vibrate in accordance with the at least one account activity-related vibration pattern.

BRIEF DESCRIPTION OF THE DRAWINGS

Various embodiments of the present disclosure can be further explained with reference to the attached drawings. The drawings shown are not necessarily to scale, with emphasis instead generally being placed upon illustrating examples of the present disclosure. Therefore, specific structural and functional details disclosed herein are not to be interpreted as limiting, but merely as examples for teaching one skilled in the art to variously employ one or more example embodiments.

DETAILED DESCRIPTION

Figure 1:
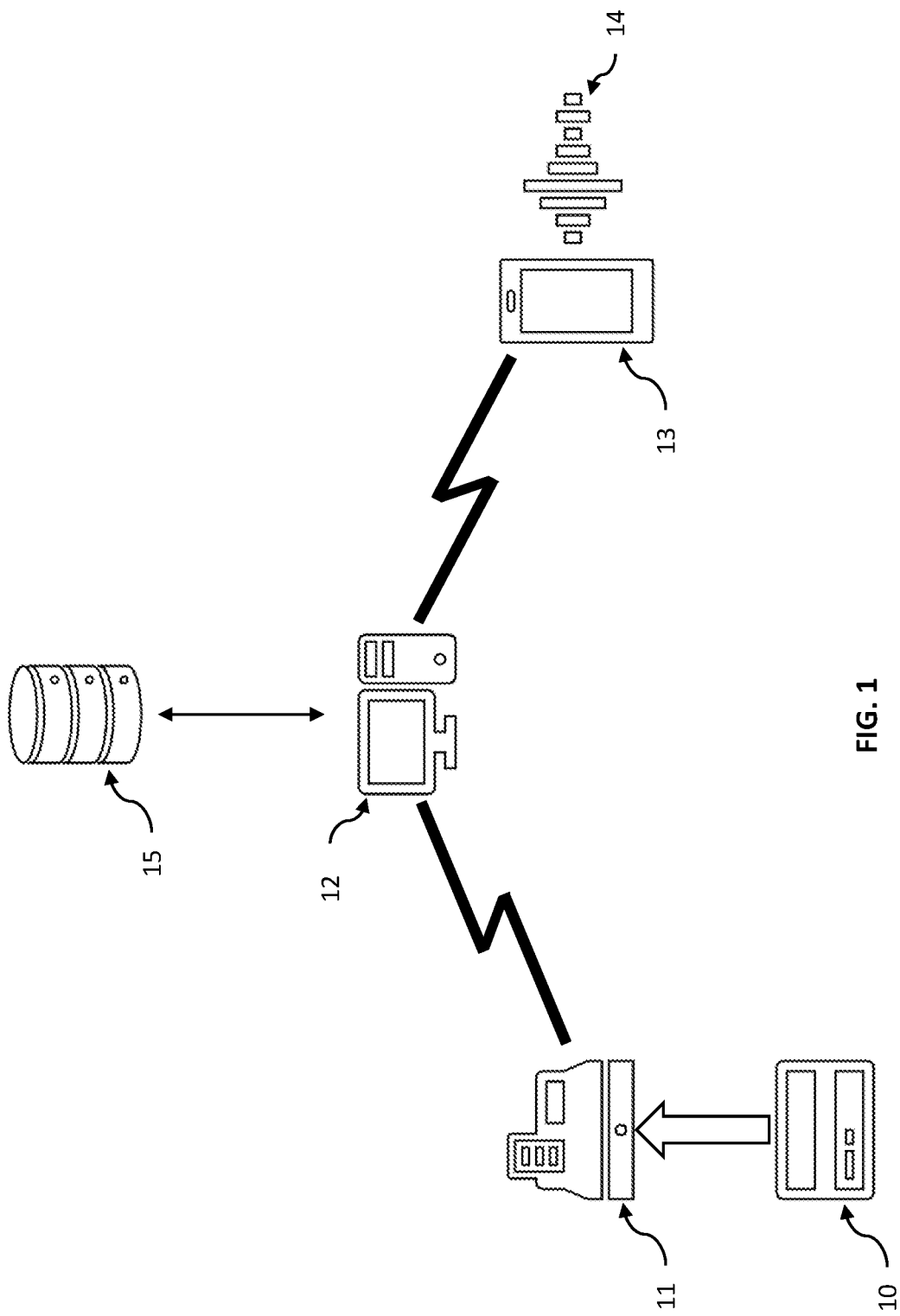
FIGS. 1-8 show one or more schematic flow diagrams, certain computer-based architectures, and/or interfaces which are examples of some aspects of at least some embodiments of the present disclosure.

Various detailed example embodiments of the present disclosure, taken in conjunction with the accompanying figures, are disclosed herein; however, it is to be understood that the disclosed embodiments are merely examples. In addition, each of the examples given in connection with the various example embodiments is intended to be example, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references.

In some embodiments, example inventive, specially programmed computing systems with associated devices may be configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

Material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Example embodiments described herein may, be implemented using any appropriate hardware and/or computing software languages (e.g., C++, Objective-C, Swift, Java, JavaScript, Python, Perl, QT, etc.).

In some embodiments, one or more of example inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of example inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of example inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, example inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, example software specifically programmed in accordance with one or more principles of the present disclosure may be downloadable from a network, for example, a website, as a stand-alone product or as an add-in package for installation in an existing software application. For example, example software specifically programmed in accordance with one or more principles of the present disclosure may also be available as a client-server software application, or as a web-enabled software application. For example, example software specifically programmed in accordance with one or more principles of the present disclosure may also be embodied as a software package installed on a hardware device.

In some embodiments, example inventive computer-based systems of the present disclosure may be configured to output to distinct, specifically programmed graphical user interface implementations of the present disclosure (e.g., a desktop, a web app., etc.). In some embodiments, information may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, only examples and not restrictive.

FIGS. 1 through 8 are example systems and methods of message communication via a vibratory signal. The following embodiments provide technical solutions and/or technical improvements that overcome technical problems, drawbacks and/or deficiencies in the technical fields involving message transmission, signal encoding, account access, account information, database communication, and/or motor control. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an example computer-based system for activity alerts using physical vibrations in accordance with one or more embodiments of the present disclosure.

In some embodiments, an example inventive vibrational activity alert system includes an account management database 15 in communication with an account management system 12 that provides vibrational alerts to a user computing device 13. In some embodiments, the vibrational alerts cause the user computing device 13 to generate an account activity-related vibration pattern 14 to notify a user about an account condition or activity.

In some embodiments, an account activity 10 is performed at an account activity initiation device 11 to cause an account change in a user's account. In some embodiments, the account activity 10 includes, e.g., use of the credit card, debit card, check, or other monetary account transaction. In some embodiments, the account activity 10 is performed at the account activity initiation device 11, including, e.g., a point-of-sale terminal, automated teller machine (ATM), online transaction system including online purchase platforms, or other payment processing device that initiates the monetary account transaction between the user's account and a second party account. For example, the user may use a credit card to make a purchase a store, which initiates a transaction to transfer monetary funds from a user account to the store account, causing a balance, or balance-related change to the user account in payment for the purchased item.

In some embodiments, such transaction or other account activity is then executed and completed by the account management system 12 to cause the balance-related change in the user account. The transaction or other account activity may result in the balance-related change, which may be recorded in the user's account stored in the account management database 15. As a result, in some embodiments, a user's account activities 10 are recorded in the user's account in the account management database 15 as per the account management system 12 transaction executions. In some embodiments, the transactions are monetary in nature and the account is a financial account, such as, e.g., a savings or checking account, credit account, asset and/or investment account, or other financial account. Thus, a transaction may affect the balance in the user's account, resulting in the balance-related change. In some embodiments, a continual, up-to-date record of the user's balance and balance-related changes is stored in the user's account in the account management database 15.

In some embodiments, the account management system 12 may receive and process the account activity 10 initiated at the account initiation device 11. In some embodiments, the account management system 12 may include, e.g., a processing system and/or processor to execute the account activity 10. For example, in some embodiments, the account management system 12 may receive a request from the account initiation device 11 to, e.g., transfer funds from one or more user accounts to a party associated with the account activity initiation device 11. In some embodiments, the account management system 12 may determine the user associated with the account activity 10 and an account associated with the user. The account management system 12 may then access the account in the account management database 15 and record, .e.g, a transfer of funds, a crediting of funds, or other change in account balance or credit balance, based on the account activity 10.

In some embodiments, the transfer of funds may result in a balance in the account being altered. For example, the account activity 10 may be a deposit, thus causing the balance of a savings or checking account to increase, or the account activity 10 may be a payment, thus causing the balance of a savings or checking account to decrease or the balance of a credit account to increase. In some embodiments, the account management system 12 records the balance and balance change resulting from the account activity 10 within the account in the account management database 15. In some embodiments, the account management database 15 may also record balance limits, such as, e.g., credit limits, overdraft limits, transaction limits, among others. In some embodiments, the user may configure the limits, such as, transaction or balance-related change limits on a per transaction basis, such as, e.g., a per-transaction limit of about 100 dollars, about 200 dollars, about 500 dollars, about 1000 dollars, or other limit for any given transaction. In some embodiments, the limits may include, transaction or balance-related change limits on a periodic basis, such as, a balance-related change limit of about 100 dollars, about 200 dollars, about 500 dollars, about 1000 dollars, about 10,000 dollars or other limit for aggregate balance-related deposits and/or withdrawals within a period, such as, about one day, about one week, about one month, about six weeks, about six months, about one year, or other suitable period.

In some embodiments, the limits are user-configurable. In some embodiments, the limits are predetermined, such as, e.g., credit limits, overdraft limits based on balance quantity, among other predetermined balance limits. In some embodiments, the limits may include a user-configurable percentage of a predetermined limit, such as, e.g., about 75% of a credit limit, or about 50% of a credit limit. In some embodiments, the limits may define threshold limits for balance-related changes that trigger an alert to the user. Thus, upon violating a threshold associated with a limit, such as a user configurable limit or predetermined limit, the account management system 12 may generate an alert including a notification of the violated threshold. For example, the account management system 12 may generate an overdraft notification upon detection that a transaction causes a balance change that results in a balance below zero. In some embodiments, the account management system 12 may generate a credit limit notification upon detection that a transaction causes a balance change that results in a credit balance exceeding a credit limit.

In some embodiments, the thresholds may include a user-configurable range of balance amounts or balance changes, such as, e.g., a first alert for balance-related changes that result in a balance violating a first threshold of a limit but not violating a second threshold, a second alert for the balance-related changes that result in the balance violating the second threshold but not violating a third threshold, and a third alert for the balance-related changes that result in the balance violating the third threshold but not violating the limit, where each threshold is user-configured or predetermined as a percentage of the limit. Any number of threshold ranges may be formed to create an alert condition triggering an associated alert a user of important, risky or fraudulent balance-related changes to the user's account.

In some embodiments, each combination of balance-related change, balance-related change amount, and/or balance amount, and associated thresholds and/or limits, form the alert conditions. Where an account activity 10 results in the violation of a threshold and/or limit of one or more of the balance-related change, balance-related change amount, and/or balance amount, the alert condition is triggered and the account management system 12 generates the corresponding alert. In some embodiments, each account activity 10 for each user causes the account management system 12 to record the respective transactions for the associated users and check the resulting respective balance-related changes against each user's predetermined and/or user-configured thresholds and limits. As a result, each user having an account in the account management database 15 may receive alerts concerning account activities that have associated important, risky or fraudulent balance-related changes in their respective account.

In some embodiments, the balance-related change may be of a type or a quantity that the account management system 12 is configured to alert the user. As a result, the account management system 12 may send the alert to, e.g., the user computing device 13 or other device associated with the user to notify the user of an account condition, balance condition, or the balance-related change itself. In some embodiments, the alert may be, e.g., a visual notification sent by a visual or legible communication system, such as, e.g., a telephone call, a simple message service (SMS) message, a multimedia messaging service (MMS) message, an internet or internet-protocol based instant message (IM), an email, a digital assistant voice or test alert (e.g., an alert via Google™ Assistant, Amazon™ Alexa™, Apple™ Siri™, Microsoft™ Cortana™, or other digital assistant), among other alerts and notifications. However, in some embodiments, the user may be visually impaired. The user may receive audible notifications, however such notifications are not always appropriate or desired. Thus, the user may prefer a notification or alert that is more private and discrete than an audible notification. Accordingly, in some embodiments, the account management system 12 may produce an alert based on account activity-related vibration patterns.

In some embodiments, the account management system 12 may determine an alert condition according, e.g., a type and/or quantity of the balance-related change compared to each threshold and/or limit to determine an applicable alert in response to the account activity 10. As described above, such an alert condition may be determined based on the relationship between a balance-related change and a limit and/or threshold for account balance and/or account balance change. In some embodiments, the type of alert condition is correlated with a vibration pattern that includes a pattern that varies by, e.g., number of vibrations, pitch, tone, length, amplitude, spacing, frequency, among other vibration characteristics, of each individual vibration in a sequence of vibrations. In some embodiments, the vibration pattern is selected includes a sequence of vibrations that indicates the type and/or quantity of the balance-related change. In some embodiments, the vibration pattern includes an account activity-related vibration pattern 14 that is selected from a library having one or more sets of account activity-related vibration pattern 14. In some embodiments, the library is stored in a memory or storage device of the account management system 12 to facilitate efficient and accurate alert generation for each alert. In some embodiments, the library may be indexed to define a particular vibration pattern in the sets of account activity-related vibration patterns that signify a particular alert condition including the type and/or quantity of balance-related changes relative to balance amount and balance change amount limits. For example, in some embodiments, account activity-related vibration patterns may be indexed according to threshold withdrawal levels, threshold deposit levels, withdrawal and/or balance limits, threshold credit balance limits, threshold credit balance change limits, among other balance-related changes and combinations thereof.

In some embodiments, to facilitate identification of an appropriate alert, the account management system 12 may recognize the balance-related change and, e.g., consult an index or look-up table organized by type of balance-related change (e.g., withdrawal, transfer, deposit) and amount of the balance-related change. In some embodiments, the index or look-up table is organized by alert conditions defined by, e.g., thresholds and/or limits of balance amount upon the balance-related change due to the account activity 10. In some embodiments, each alert condition has an account activity-related vibration pattern assigned to it. In some embodiments, the account management service 13 may, therefore, compare a balance-related change to the index or look-up table to determine an alert condition and the corresponding assigned account activity-related vibration pattern.

In some embodiments, the vibration library of the processing system in the account management system 12 includes vibration patterns that correspond to coded messages rather than a correlation to an alert condition. For example, the vibration patterns may be decipherable or translatable into a spoken and/or written language, including a vocabulary and grammar. As a result, the library may include, e.g., a dictionary or vocabulary and/or phrases in a vibrational code according to the pitch and tone of individual vibrations, or may include a vibration translation algorithm for encoding and decoding an alert between the spoken and/or written language and a sequence of vibrations varying by, e.g., number of vibrations, pitch, tone, length, amplitude, spacing, frequency, among other vibration characteristics. As such, upon triggering an alert condition, the account management system 12 may determine a notification describing a balance-related change or balance-related amount in a spoken or written language, and translate the notification into an account activity-related vibration pattern according to the library. In some embodiments, upon triggering an alert condition, the account management system 12 may determine a notification describing a balance-related change or balance-related amount directly in an account activity-related vibration pattern according to the library.

In some embodiments, based on the account activity-related vibration pattern assigned to the alert condition triggered balance-related change of the account activity 10, the account management system 12 may formulate a message to alert the user of the user computing device 13. In some embodiments, the message includes the account activity-related vibration pattern. Thus, in some embodiments, the account management system 12 may encode the account activity-related vibration pattern into a signal containing the message using, e.g., the processing system described above, for transmission to the user computing device 13. The signal may then be communicated, via, e.g., wireless or wired transmission, to the user computing device 13. In some embodiments, the signal may be communicated to, e.g., one or more alternative and/or additional alert devices associated with the user.

In some embodiments, the user computing device 13 may receive the signal with the account activity-related vibration pattern encoded therein. Upon reception, the signal may cause the user computing device 13 to vibrate according to the account activity-related vibration pattern. For example, in some embodiments, the signal may be received by, e.g., a receiver and decoded by a processing system at the user computing device 13. In some embodiments, decoding the signal reveals a set of processing instructions for producing the account activity-related vibration pattern. As a result, in some embodiments, a processor and/or controller may receive the instructions control a vibration motor to vibrate such that the account activity-related vibration pattern 14 is emitted from the user computing device 13. In some embodiments, each alternative and/or additional alert devices includes a similar processor or controller for controlling a vibration motor. The alternative and/or additional alert devices may receive the signal and emit the vibration pattern instead of, or in conjunction with the user computing device 13. For example, the user computing device 23 may be a device that does not have a vibration motor. Thus, an alternative alert device may be placed in wired and/or wireless communication with the user computing device to receive the signal and produce the vibration pattern. In some embodiments, the alternative and/or additional alert devices are additional user computing devices 13 in communication with the account management system 12 such that multiple user computing devices 13 associated with the user receive the signal.

In some embodiments, the vibration motor generates the vibrations of the account activity-related vibration pattern 14 by producing vibrations that vary according to, e.g., tone, pitch, length, amplitude, spacing and/or frequency to produce a human-perceptible pattern of vibrations. Accordingly, in some embodiments, the account activity-related vibration pattern 14 includes a sequence of one or more vibrations, with each vibration having a frequency, length, and amplitude sufficient to be perceived and distinguished from each other vibration in the sequence. From the sequence, the user may perceive the pattern and understand the alert condition triggered by the account activity 10. For example, the account activity-related vibration pattern 14 may convey to the user that a balance of the account has dropped below a predetermined threshold or limit, or that the credit balance is with a threshold range of a credit limit, or other balance-related change as described above with respect to the alert conditions and associated thresholds and/or limits. Accordingly, the user computing device 13 may inform a user of the state of the user's account by producing the account activity-related vibration pattern 14 according to a predetermined library or vibration patterns. Thus, an efficient and untestable communication of account conditions may be conveyed to a user with visual impairments or a preference for non-audible, non-visual notifications for private and effective account updates.

Figure 2:
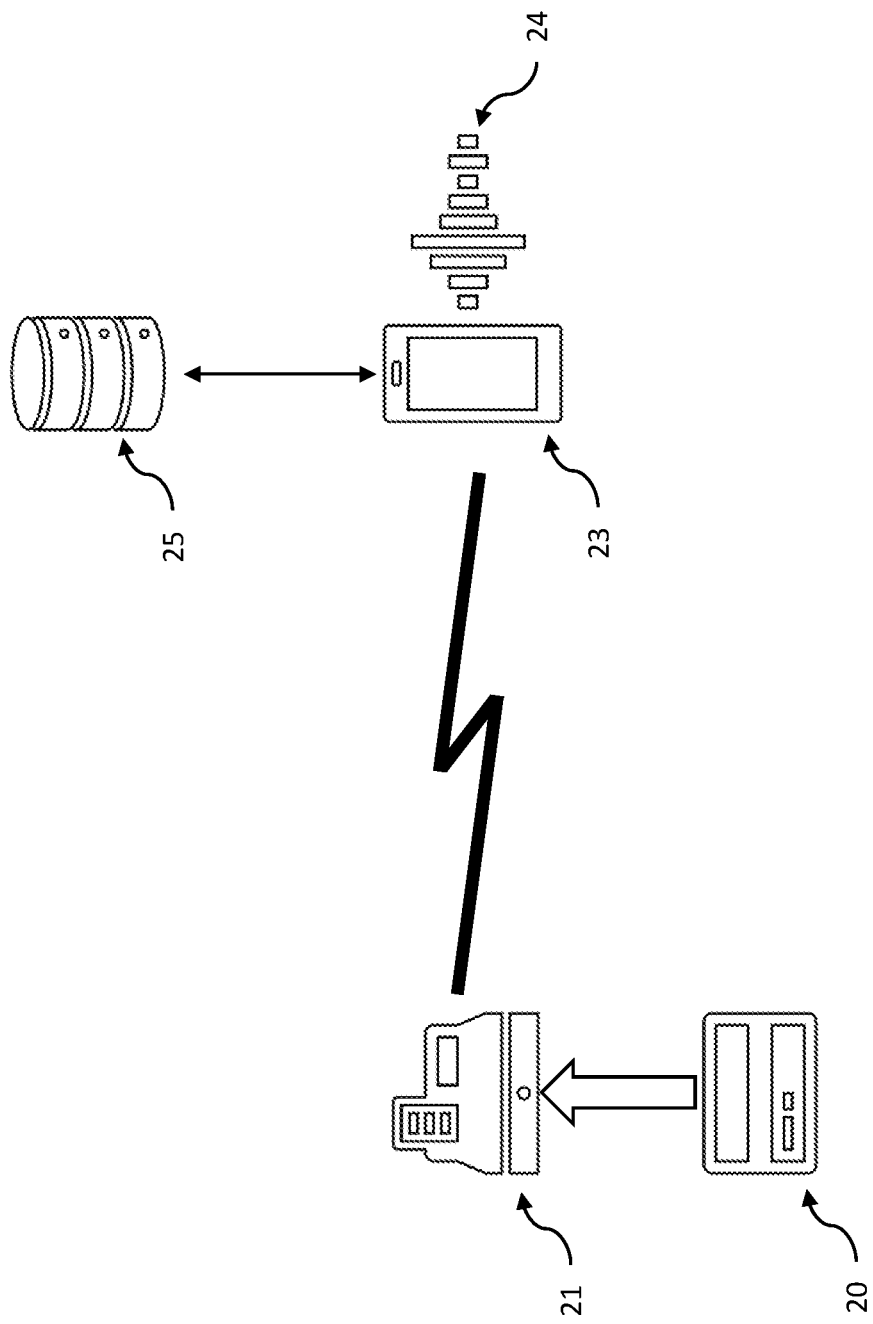

FIG. 2 is a block diagram of another example computer-based system activity alerts using physical vibrations in accordance with one or more embodiments of the present disclosure.

In some embodiments, an example inventive vibrational activity alert system includes user computing device 23 in communication with an account management system 22 that provides vibrational alerts to a user. In some embodiments, the vibrational alerts cause the user computing device 23 to generate an account activity-related vibration pattern 24 to notify a user about an account condition or activity.

In some embodiments, an account activity 20 is performed at an account activity initiation device 21 to cause an account change in a user's account. In some embodiments, the account activity 20 includes, e.g., use of the credit card, debit card, check, or other monetary account transaction. In some embodiments, the account activity 20 is performed at the account activity initiation device 21, including, e.g., a point-of-sale terminal, automated teller machine (ATM), online transaction system including online purchase platforms, or other payment processing device that initiates the monetary account transaction between the user's account and a second party account. For example, the user may use a credit card to make a purchase a store, which initiates a transaction to transfer monetary funds from a user account to the store account, causing a balance, or balance-related change to the user account in payment for the purchased item.

In some embodiments, such transaction or other account activity may be executed and completed by an account management system to cause the balance-related change in the user account, however in other embodiments, the user computing device 23 may executed the balance-related change. The transaction or other account activity may result in the balance-related change, which may be recorded in the user's account stored in the account management database 25. As a result, in some embodiments, a user's account activities 20 are recorded in the user's account in the account management database 25. In some embodiments, the transactions are monetary in nature and the account is a financial account, such as, e.g., a savings or checking account, credit account, asset and/or investment account, or other financial account. Thus, each transaction may affect the balance in the user's account, resulting in the balance-related change. In some embodiments, a continual, up-to-date record of the user's balance and balance-related changes is stored in the user's account in the account management database 25.

In some embodiments, the user computing device 23 may receive and process an indication of the account activity 20 initiated at the account activity initiation device 21. In some embodiments, the user computing device 23 may include, e.g., a processing system and/or processor to receive a request from the account initiation device 21 to, e.g., transfer funds from one or more user accounts to a party associated with the account activity initiation device 21. In some embodiments, the user computing device 23 may access the account in the account database 25 associated with the account activity 20 and record a transfer of funds based on the account activity 20.

In some embodiments, the transfer of funds may result in a balance in the account being altered. For example, the account activity 20 may be a deposit, thus causing the balance of a savings or checking account to increase, or the account activity 20 may be a payment, thus causing the balance of a savings or checking account to decrease or the balance of a credit account to increase. In some embodiments, an account management system records the balance and balance change resulting from the account activity 20 within the account in the account management database 25. In some embodiments, the account management database may also record balance limits, such as, e.g., credit limits, overdraft limits, transaction limits, among others. However, in some embodiments, the user computing device 23 records the balance and balance limits in the account management database 25.

In some embodiments, the user computing device 23 may compare an indicated account activity 20 with an account status, such as, e.g., a balance, of an associated account, as recorded in the account management database 25. The comparison may be used to determine an account activity-related balance-related change to the account status. In some embodiments, the user may configure the limits with a graphical user interface at the user computing device 23. In some embodiments, the limits may include, transaction or balance-related change limits on a per transaction basis, such as, e.g., a per-transaction limit of about 200 dollars, about 200 dollars, about 500 dollars, about 2000 dollars, or other limit for any given transaction. In some embodiments, the limits may include, transaction or balance-related change limits on a periodic basis, such as, a balance-related change limit of about 200 dollars, about 200 dollars, about 500 dollars, about 2000 dollars, about 20,000 dollars or other limit for aggregate balance-related deposits and/or withdrawals within a period, such as, about one day, about one week, about one month, about six weeks, about six months, about one year, or other suitable period.

In some embodiments, the limits are user-configurable and/or include user-configurable thresholds for approaching limits. In some embodiments, the limits are predetermined, such as, e.g., credit limits, overdraft limits based on balance quantity, among other predetermined balance limits. In some embodiments, the limits may include a threshold such as, a user-configurable percentage of a predetermined limit, such as, e.g., about 75% of a credit limit, or about 50% of a credit limit. In some embodiments, the limits may define the threshold for balance-related changes that trigger an alert to the user. Thus, upon violating a threshold associated with a limit, such as a user configurable limit or predetermined limit, the user computing device 23 may generate an alert including a notification of the violated threshold. For example, the user computing device 23 may generate an overdraft notification upon detection that a transaction causes a balance change that results in a balance below zero. In some embodiments, the user computing device 23 may generate a credit limit notification upon detection that a transaction causes a balance change that results in a credit balance exceeding a credit limit.

In some embodiments, the thresholds may include a user-configurable range of balance amounts or balance changes, such as, e.g., a first alert for balance-related changes that result in a balance violating a first threshold of a limit but not violating a second threshold, a second alert for the balance-related changes that result in the balance violating the second threshold but not violating a third threshold, and a third alert for the balance-related changes that result in the balance violating the third threshold but not violating the limit, where each threshold is user-configured or predetermined as a percentage of the limit. Any number of threshold ranges may be formed to create an alert condition triggering an associated alert a user of important, risky or fraudulent balance-related changes to the user's account.

In some embodiments, each combination of balance-related change, balance-related change amount, and/or balance amount, and associated thresholds and/or limits, form the alert conditions. Where an account activity 20 results in the violation of a threshold and/or limit of one or more of the balance-related change, balance-related change amount, and/or balance amount, the alert condition is triggered and the user computing device 23 generates the corresponding alert. In some embodiments, each account activity 20 for the user causes the user computing device 23 to record the respective transactions for the user and check the resulting respective balance-related changes against the user's predetermined and/or user-configured thresholds and limits. As a result, the user having an account in the account management database 25 may receive alerts concerning account activities that have associated important, risky or fraudulent balance-related changes in their respective account.

In some embodiments, the balance-related change may be of a type or a quantity for which the user computing device 23 is configured to alert the user. As a result, the user computing device 23 may send the alert to, e.g., an alert device or other device associated with the user to notify the user of an account condition, balance condition, or the balance-related change itself. However, in some embodiments, the alert is generated at the user computing device 23 itself. In some embodiments, the alert may be, e.g., a visual notification sent by a visual or legible communication system, such as, e.g., a telephone call, a simple message service (SMS) message, a multimedia messaging service (MMS) message, an internet or internet-protocol based instant message (IM), an email, a digital assistant voice or test alert (e.g., an alert via Google™ Assistant, Amazon™ Alexa™, Apple™ Siri™, Microsoft™ Cortana™, or other digital assistant), among other alerts and notifications. However, in some embodiments, the user may be visually impaired. The user may receive audible notifications, however such notifications are not always appropriate or desired. Thus, the user may prefer a notification or alert that is more private and discrete than an audible notification. Accordingly, in some embodiments, the account management system 22 may produce an alert based on account activity-related vibration patterns.

In some embodiments, the user computing device 23 may determine an alert condition according, e.g., a type and/or quantity of the balance-related change compared to each threshold and/or limit to determine an applicable alert in response to the account activity 20. As described above, such an alert condition may be determined based on the relationship between a balance-related change and a limit and/or threshold for account balance and/or account balance change. In some embodiments, the type of alert condition is correlated with a vibration pattern that includes a pattern that varies by, e.g., pitch, tone, length, amplitude, spacing, frequency, among other vibration characteristics, of each individual vibration in a sequence of vibrations. In some embodiments, the vibration pattern is selected includes a sequence of vibrations that indicates the type and/or quantity of the balance-related change. In some embodiments, the vibration pattern includes an account activity-related vibration pattern 24 that is selected from a library having one or more sets of account activity-related vibration pattern 24. In some embodiments, the library is stored in a memory or storage device of the user computing device 23 to facilitate efficient and accurate alert generation for each alert. In some embodiments, the library may be indexed to define a particular vibration pattern in the sets of account activity-related vibration patterns that signify a particular alert condition including the type and/or quantity of balance-related changes relative to balance amount and balance change amount limits. For example, in some embodiments, account activity-related vibration patterns may be indexed according to threshold withdrawal levels, threshold deposit levels, withdrawal and/or balance limits, among other balance-related changes and combinations thereof.

In some embodiments, to facilitate identification of an appropriate alert, the user computing device 23 may recognize the balance-related change and, e.g., consult an index or look-up table organized by type of balance-related change (e.g., withdrawal, transfer, deposit) and amount of the balance-related change. In some embodiments, the index or look-up table is organized by alert conditions defined by, e.g., thresholds and/or limits of balance amount upon the balance-related change due to the account activity 20. In some embodiments, each alert condition has an account activity-related vibration pattern assigned to it. In some embodiments, the user computing device 23 may, therefore, compare a balance-related change to the index or look-up table to determine an alert condition and the corresponding assigned account activity-related vibration pattern.

In some embodiments, the vibration library of the processing system in the user computing device 23 includes vibration patterns that correspond to coded messages rather than a correlation to an alert condition. For example, the vibration patterns may be decipherable or translatable into a spoken and/or written language, including a vocabulary and grammar. As a result, the library may include, e.g., a dictionary or vocabulary and/or phrases in a vibrational code according to the pitch and tone of individual vibrations, or may include a vibration translation algorithm for encoding and decoding an alert between the spoken and/or written language and a sequence of vibrations varying by, e.g., pitch, tone, length, amplitude, spacing, frequency, among other vibration characteristics. As such, upon triggering an alert condition, the user computing device 23 may determine a notification describing a balance-related change or balance-related amount in a spoken or written language, and translate the notification into an account activity-related vibration pattern according to the library. In some embodiments, upon triggering an alert condition, the user computing device 23 may determine a notification describing a balance-related change or balance-related amount directly in an account activity-related vibration pattern according to the library.

In some embodiments, based on the account activity-related vibration pattern assigned to the alert condition triggered balance-related change of the account activity 20, the user computing device 23 may formulate a message to alert the user. In some embodiments, the message includes the account activity-related vibration pattern. Thus, in some embodiments, the user computing device 23 may encode the account activity-related vibration pattern into a signal containing the message using, e.g., the processing system described above, for transmission to one or more additional or alternative alert devices for generating an alert for the user. The signal may then be communicated, via, e.g., wireless or wired transmission, to the additional or alternative alert devices.

In some embodiments, the signal is communicated to, e.g., a motor controller, such as the motor controller for a vibration motor of the user computing device 23. The signal may cause the user computing device 23 to vibrate according to the account activity-related vibration pattern. For example, in some embodiments, the signal may carry a set of processing instructions for causing the motor controller to control the vibration motor to produce the selected the account activity-related vibration pattern. As a result, in some embodiments, the motor controller may include, e.g., a processor and/or controller to receive the instructions and control a vibration motor to vibrate such that the account activity-related vibration pattern 24 is emitted from the user computing device 23. In some embodiments, each alternative and/or additional alert devices includes a similar processor or controller for controlling a vibration motor. The alternative and/or additional alert devices may receive the signal and emit the vibration pattern instead of, or in conjunction with the user computing device 23. For example, the user computing device 23 may be a device that does not have a vibration motor. Thus, an alternative alert device may be placed in wired and/or wireless communication with the user computing device to receive the signal and produce the vibration pattern.

In some embodiments, the vibration motor generates the vibrations of the account activity-related vibration pattern 24 by producing vibrations that vary according to, e.g., tone, pitch, length, amplitude, spacing and/or frequency to produce a human-perceptible pattern of vibrations. Accordingly, in some embodiments, the account activity-related vibration pattern 24 includes a sequence of one or more vibrations, with each vibration having a frequency, length, and amplitude sufficient to be perceived and distinguished from each other vibration in the sequence. From the sequence, the user may perceive the pattern and understand the alert condition triggered by the account activity 20. For example, the account activity-related vibration pattern 24 may convey to the user that a balance of the account has dropped below a predetermined threshold or limit, or that the credit balance is with a threshold range of a credit limit, or other balance-related change as described above with respect to the alert conditions and associated thresholds and/or limits. Accordingly, the user computing device 23 may inform a user of the state of the user's account by producing the account activity-related vibration pattern 24 according to a predetermined library or vibration patterns. Thus, an efficient and untestable communication of account conditions may be conveyed to a user with visual impairments or a preference for non-audible, non-visual notifications for private and effective account updates.

Figure 3:
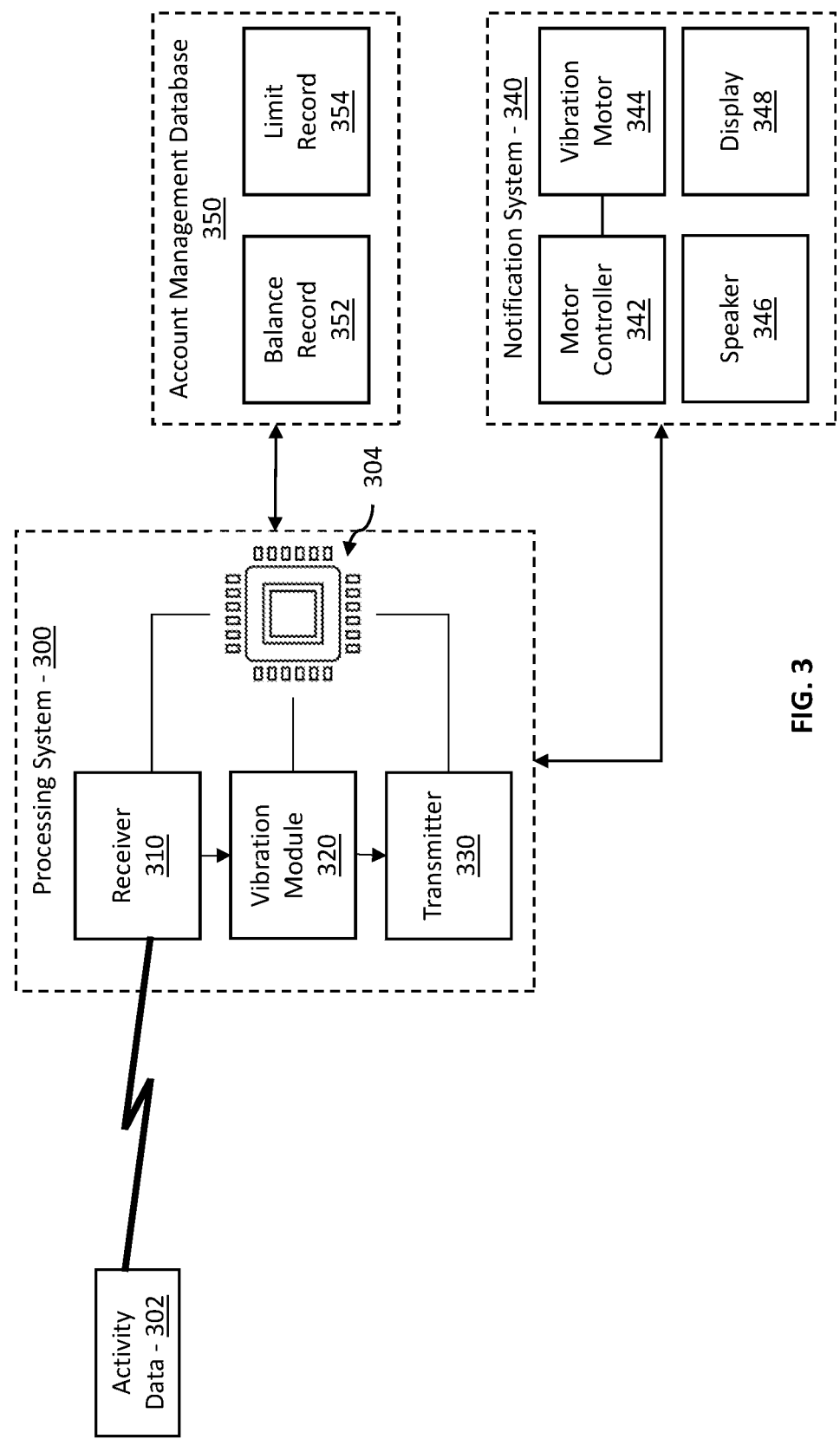

FIG. 3 is a block diagram of another example computer-based system including a processing system for generating activity alerts using physical vibrations in accordance with one or more embodiments of the present disclosure.

In some embodiments, an account activity may be analyzed by a processing system 300 of, e.g., an account management system 12 and/or user computing device 23, as described above. The processing system 300 may employ a processor 304 to interface with an account management database 350 and a notification system 340 of, e.g., an alert device to generate account activity-related alerts based on activity data 302 of the account activity.

In some embodiments, the activity data 302 associated with an account-related activity may be communicated to a receiver 310 of the processing system 300. In some embodiments, the receiver 310 may receive the activity data 302 by an electronic communication method, such as, e.g., a wireless connection including, e.g., WiFi, Bluetooth™, Zig-Bee™, Z-Wave™, code division multiple access (CDMA), global system of mobiles (GSM), 4G, 5G, or other wireless communication method, or a wired connection such as, e.g., fiber optic, cable, ethernet, telephone, or other wired connection. In some embodiments, the activity data 302 may include, e.g., an electronic or software representation of, e.g., a transaction type and a transaction amount associated with an account of a user, such as, e.g., a purchase at a physical store using a point-of-sale terminal, a transaction at an ATM, an online purchase or money transfer, or other transaction.

In some embodiments, this activity data 302 may be encoded in a signal received by the receiver 310. The receiver 310 may intake the signal and decode the signal to extract the activity data 302 as instructed by the processor 304. In some embodiments, the activity data 302 may be represented in a data format, such as, e.g., Javascript Object Notation (JSON), extensible markup language (XML), or other machine readable format. In some embodiments, the data format provides a representation of the activity data 302 using, e.g., tables, lists, tuples, arrays, strings, comma delimited text, space delimited text, among other data structures.

In some embodiments, the activity data 302 may be analyzed by a vibration module 320 using the processor 304 to determine whether an alert is appropriate, and a vibration pattern to represent that alert. In some embodiments, the processor 304 communicated with the account management database 350 to identify balance-related changes in a user's account due to the account activity related to the account data 302. In some embodiments, the processor 304 provides the activity data 302 to the account management database 350 to, e.g., update a balance record 352 according to transaction details, such as, e.g., transaction type and transaction amount. In some embodiments, the processing system 300 may communicate with the account management database 350 via, e.g., a wired or wireless connection using the receiver 310, such as those described above, or by a computer bus or other computer interface. However, in some embodiments, the account management database 350 has already been updated by, e.g., a separate processing system associated with an account management system to update the balance record 352.

In some embodiments, the balance record 352 includes a record of account-related activities and balance-related changes, such as, e.g., transactions, payments, fund transfers, deposits, among others and combinations thereof. Moreover, other account-related information can be maintained in the account management database 350. For example, the account management database 350 may include, e.g., a limit record 354 that maintains a record of balance-related limits, such as, e.g., credit limits, security limits for transactions, among other balance-related change limits. In some embodiments, the limits are predetermined according to, e.g., business policies, security policies, risk policies, or other policies. However, in some embodiments, the limits may be user configurable.

In some embodiments, the vibration module 320 may utilize the balance record 352 and/or the limit record 354 to determine at least one account activity-related vibration pattern. In some embodiments, the account activity-related vibration patterns are selected from a set of account activity-related vibration patterns in, e.g., a memory or storage device maintaining a library of account activity-related vibration patterns. In some embodiments, the selection of the account activity-related vibration patterns with respect to, e.g., a balance-related change in the balance record 352 and a comparison to limits in the limit record 354.

In some embodiments, each account activity-related vibration pattern includes a sequence of one or more vibrations, with each vibration being defined by characteristics, such as, e.g., pitch, tone, frequency, amplitude, length, period, among other characteristics. Thus, each account activity-related vibration pattern can define a unique message or alert according to a combination of, e.g., pitch and tone of vibrations in an ordered sequence, where the sequence is between about, e.g., one and about 20 vibrations in length.

In some embodiments, the vibration module 320, upon determining, the account activity-related vibration patterns, may encode the selected account activity-related vibration patterns into a signal. The encoding may include, e.g., a media encoding, such as, e.g., MP3, M4A, WMA, FLAC, or other encoding. In some embodiments, the encoding of each account activity-related vibration pattern is performed by the processor 304 to encode the account activity-related vibration patterns into a, e.g., lossless vibration encoding format. In some embodiments, the encoding is configured to be utilized by at least one vibration motor of at least one computing device to vibrate in accordance with each account activity-related vibration pattern.

In some embodiments, the encoding may be provided to a transmitter 330. The transmitter 330 may communicate, via a wired or wireless communication connection, such as those described above, to, e.g., the notification system 340. In some embodiments, the notification system 340 is in direct communication with the processing system 300, such as with the processor 304 via, e.g., a bus.

In some embodiments, the signal in which the account activity-related vibration patterns are encoded is received by the notification system 340. For example, in some embodiments, the account activity-related vibration pattern is provided by the notification system 340 to a motor controller 342. The motor controller 342 receives the signal and the encoding provides instructions for controlling a vibration motor 344 according to the account activity-related vibration patterns. As a result, in some embodiments, the vibration encoding of each account activity-related vibration pattern causes the vibration motor 344 of the notification system 340 of, e.g., a user computing device, such as the user computing devices 13 and 23 described above, to vibrate in accordance with the account activity-related vibration patterns.

In some embodiments, processing system 300 may also provide audible and visual alerts based on, e.g., the activity data 302 and/or the balance-related change. As a result, in some embodiments, the notification system 340 also emits an audible alert of the balance-related change via a speaker 346, and a visual alert via a display 348 of the user computing device.

Figure 4:
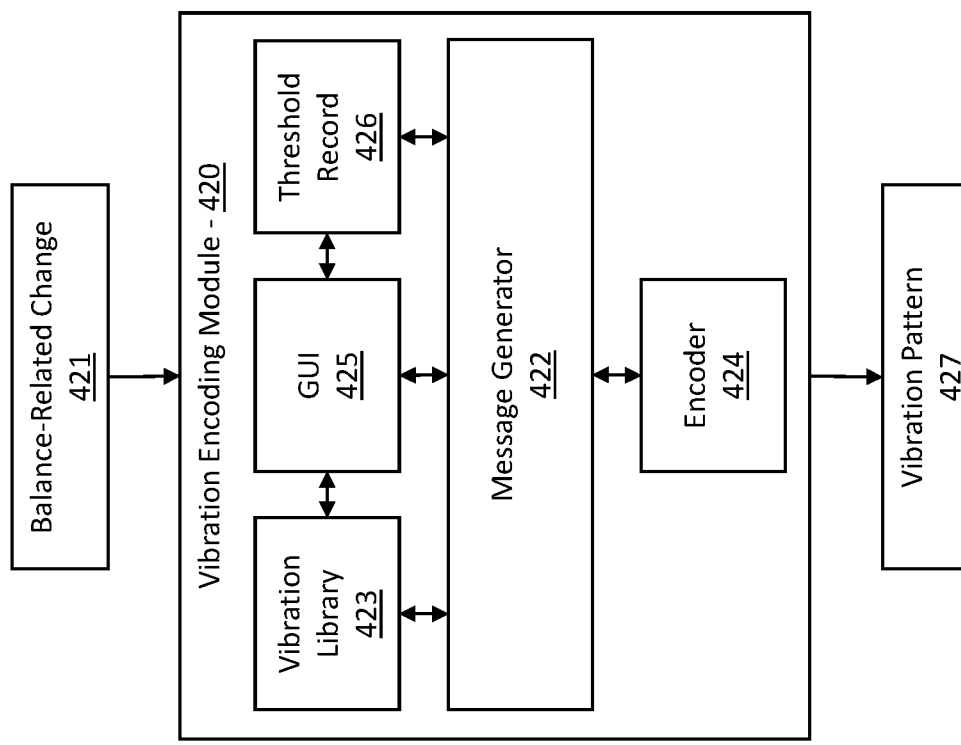

FIG. 4 is a block diagram of another example computer-based system a vibration encoding module for generating physical vibrations from activity alerts in accordance with one or more embodiments of the present disclosure.

In some embodiments, a vibration encoding module 420 selects one or more account activity-related vibration patterns 427 from a set of vibration patterns based on a balance-related change 421 received from, e.g., an account management database, an account management system, a processing system, or other suitable system for determining a balance-related change 421 caused by an account activity. For example, the balance-related change 421 may include, e.g., an increase or decrease in a balance of a user account. In some embodiments, the balance-related change 421 includes the change type (e.g., increase, decrease, etc.), a change amount, a current balance amount, and/or balance related limits, such as, e.g., a credit limit, a withdrawal limit, a security limit, among other limits on balance-related changes 421.

In some embodiments, the vibration encoding module 420 may include, e.g., hardware and software components, such as, e.g., instructions stored in a memory and/or storage device, and/or a processor for executing the instructions, among other software and hardware components, and combinations thereof. The vibration encoding module 420 employs the software and hardware components to recognize the balance-related change 421 data, including, e.g., the change type, amount, current balance amount, and balance limits. In some embodiments, the balance-related change 421 may include structured data including data items for each of change type, amount, current balance amount, and balance limits.

In some embodiments, the vibration encoding module 420 generates a message including the account activity-related vibration pattern 427 using the message generator 422. In some embodiments, based on the balance-related change 421, the message generator 422 may search a vibration library 423 for matching account activity-related vibration patterns from sets of account activity-related vibration patterns.

In some embodiments, the vibration library 423 includes sets of account activity-related vibration patterns. The vibration library 423 may be one large set of account activity-related vibration patterns. However, in some embodiments, the vibration library 423 may include multiple subsets of the full library, each subset including a set of account activity-related vibration patterns. In some embodiments, the sets may be categorized by types of balance-related changes 421 to which the included account activity-related vibration patterns correspond. For example, there may be, e.g., a payment set, a deposit set, a withdrawal set, an automated payment set, a fund transfer set, a balance status set, a balance limit set, among other possible sets and combinations thereof. In some embodiments, each account activity-related vibration pattern in each set of account activity-related vibration patterns may be correlated to, e.g., a balance-related alert condition.

In some embodiments, each balance-related alert condition may be a predetermined and/or user-configured trigger for an alert based on the balance-related change 421. In some embodiments, the balance-related alert conditions may include, e.g., a warning of a suspicious transaction, a warning that a balance-related limit is near, an alert that a payment is due, or other warnings and alerts for which a user may be notified. In some embodiments, the balance-related alert conditions may include balance-related changes 421 that bring the account balance near to the balance limits, such as, e.g., credit limits, overdraft limits, transaction limits, among others. The alert conditions based on proximity to the balance limits may be set at the balance limits themselves, and thus are predetermined. In some embodiments, the limits may include, transaction or balance-related change limits on a per transaction basis, such as, e.g., a per-transaction limit of about 200 dollars, about 200 dollars, about 500 dollars, about 2000 dollars, or other limit for any given transaction. In some embodiments, the limits may include, transaction or balance-related change limits on a periodic basis, such as, a balance-related change limit of about 200 dollars, about 200 dollars, about 500 dollars, about 2000 dollars, about 20,000 dollars or other limit for aggregate balance-related deposits and/or withdrawals within a period, such as, about one day, about one week, about one month, about six weeks, about six months, about one year, or other suitable period.

However, in some embodiments, a user may configure different or additional alert conditions by setting balance-related thresholds in a threshold record 426 via, e.g., a vibration-pattern defining graphical user interface (GUI) 425. Using the GUI 425, a user may enter a threshold on, e.g., a balance amount relative to a balance limit, such as, e.g., a credit limit. For example, the user may enter into the GUI 425 a threshold including, e.g., 75 percent, 50 percent, 25 percent, 10 percent, etc., of the credit limit of a credit account, where a balance-related change 421 resulting the credit balance exceeding 75 percent of the credit limit triggers the account-related alert condition associated with the threshold. In another example, the user may enter into the GUI 425 a predetermined balance amount, such as, e.g., a credit balance of about $200, about $300, about $500, about $750, about $1000, etc., where a balance-related change 421 resulting the credit balance exceeding $1000 triggers the account-related alert condition associated with the threshold. Similarly, in a savings or checking account, for example, the threshold may include minimum threshold amounts to trigger alert conditions, such as, e.g., a balance-related change 421 causing the balance amount to drop below, e.g., about $500, about $300, about $250, about $200, about $100, about $50, about $10, etc., may trigger an alert condition.

For each user account, the user may configured multiple balance amount thresholds and/or balance limit thresholds for multiple alert conditions related to balance-related changes 421 in each account. For example, a user may configure three thresholds on a checking account: a first threshold where the balance-related change 421 causes a balance amount to drop below the first threshold but not below a second threshold, which results in a first alert condition; a second threshold, where a balance-related change 421 causes the balance amount to drop below the second threshold but not below a third threshold, which results in a second alert condition; and a third threshold, where a balance-related change 421 causes the balance amount to drop below the third threshold, which results in a third alert condition. The user may use the GUI 425 to enter any number and configuration of thresholds to add to the threshold record 426.

In some embodiments, each threshold in the threshold record 426 and each balance-related limit forms an alert condition that triggers the message generator 422 to generate a message including an associated account activity-related vibration pattern 427 alert. In some embodiments, there may be alert conditions not related to a threshold or limit. For example, in some embodiments, the GUI 425 may allow the user to configure an alert condition for every balance-related change 421 received. In some embodiments, the GUI 425 may allow the user to configure an alert condition for periodic balance updates, such as, e.g., every day, every week, every two weeks, twice per month, every month, or other suitable period for balance updates. Other alert conditions for notifying a user are contemplated.

In some embodiments, each combination of balance-related change, balance-related change amount, and/or balance amount, and associated thresholds and/or limits, form the alert conditions. Where balance-related change 421 includes the violation of a threshold and/or limit, the message generator 422 determines the triggering of a corresponding alert condition. In response, the message generator 422 may identify or generate an account activity-related vibration pattern 427 associated with alert condition. In some embodiments, the message generator 422 may produce an associated account activity-related vibration pattern 427 by, e.g., employing the vibration library 423.

In some embodiments, the vibration library 423 is stored in a memory or storage device of the vibration encoding module 420 to facilitate efficient and accurate alert generation for each alert. In some embodiments, the vibration library 423 may be indexed to define a particular vibration pattern in the sets of account activity-related vibration patterns that signify each particular alert condition including the type and/or quantity of balance-related changes relative to balance amount and balance change amount limits.

In some embodiments, to facilitate generation of each account activity-related vibration pattern 427, the message generator 422 may employ, e.g., an index or look-up table that is organized by alert conditions defined by, e.g., alert periods, thresholds and/or limits of balance amount, etc., upon the balance-related change 421. In some embodiments, each alert condition has an account activity-related vibration pattern assigned to it. In some embodiments, the message generator 422 may, therefore, compare a balance-related change 421 to the index or look-up table to determine the alert condition and the corresponding assigned account activity-related vibration pattern 427.

In some embodiments, the account activity-related vibration patterns may be predefined. However, in some embodiments, the GUI 425 may allow a user to configure account activity-related vibration patterns in the vibration library 423. For example, a user may specify a vibration or vibration sequence, and assign the vibration or vibration sequence to a particular alert condition. In some embodiments, the GUI 425 presents options various predefined patterns that a user may configure to assign to selected alert conditions. In some embodiments, the GUI 425 may provide options of individual vibrations that the user may select from to form a pattern or sequence, and assign a selected alert condition. In some embodiments, the GUI 425 may provide options for define characteristics of each vibration, and build a sequence from vibrations with user defined characteristics. In some embodiments, the characteristics may include, e.g., the pitch, the tone, the period, the frequency, the spacing, amplitude, among other characteristics, of an individual vibration. In some embodiments, the GUI 425 may provide options to allow a user to configure a sequence of repeating vibration patterns. Other user configuration options are also contemplated such that the user may interact with the GUI 425 to establish desired balance alerts and corresponding identifiable vibrations and vibration sequences such that the user may be readily determine the alert condition upon the generation of each account activity-related vibration pattern 427.

In some embodiments, the vibration library 423 includes vibration patterns that correspond to coded messages rather than a correlation to an alert condition. For example, the vibration patterns may be decipherable or translatable into a spoken and/or written language, including a vocabulary and grammar. As a result, the vibration library 423 may include, e.g., a dictionary or vocabulary and/or phrases in a vibrational code according to the pitch and tone of individual vibrations, or may include a vibration translation algorithm for encoding and decoding an alert between the spoken and/or written language and a sequence of vibrations varying by, e.g., pitch, tone, length, amplitude, spacing, frequency, among other vibration characteristics. As such, upon triggering an alert condition, the message generator 422 may determine a notification describing a balance-related change 421 in a spoken or written language, and translate the notification into an account activity-related vibration pattern according to the vibration library 423. In some embodiments, upon triggering an alert condition, the message generator 422 may determine a notification describing a balance-related change 421 or balance-related amount directly in an account activity-related vibration pattern 427 according to the vibration library 423.

In some embodiments, based on the account activity-related vibration pattern 427 assigned to the alert condition triggered by the balance-related change 421, the message generator 422 may formulate a message to alert the user. In some embodiments, the message includes the account activity-related vibration pattern 427. In some embodiments, the message may also include, e.g., a text-based representation of the alert condition, an audible representation of the alert condition, or any other audio-visual notification according to an alert condition triggered by the balance-related change 421.

In some embodiments, the message generator 422 may provide the message including the account activity-related vibration pattern 427 to an encoder 424 for, e.g., communication to another device or component. In some embodiments, the encoder 424 may encode the account activity-related vibration pattern into a signal containing the message using, e.g., a processor or processing system, for transmission to one or more additional or alternative alert devices for generating an alert for the user. The signal may then be communicated, via, e.g., wireless or wired transmission, to the additional or alternative alert devices. However, in some embodiments, the encoder 424 may encode the message from data defining the message contents and the account activity-related vibration pattern 427 into a set of instructions performable by, e.g., a processor or controller. Thus, the message may be provided directly to, e.g., a motor controller to cause the motor controller to control a vibration motor to vibrate according to the account activity-related vibration patter 427.

Accordingly, in some embodiments, in response to a balance-related change 421, a vibration encoding module 420 in, e.g., an account management system or user computing device, or other device, may generate a signal and/or message carrying the account activity-related vibration pattern 427. In some embodiments, the account activity-related vibration pattern 427 may include one or more vibrations that varies by, e.g., number of vibrations, pitch, tone, length, amplitude, spacing, frequency, among other vibration characteristics, of each individual vibration in a sequence of vibrations. As a result, upon controlling a vibration motor to vibrate according to the account activity-related vibration pattern 427, a user may perceive the pattern in the vibrations and deduce the alert condition, thus notifying the user, without need for audible or visual alerts, of a status of an account associated with the user.

Figure 5:
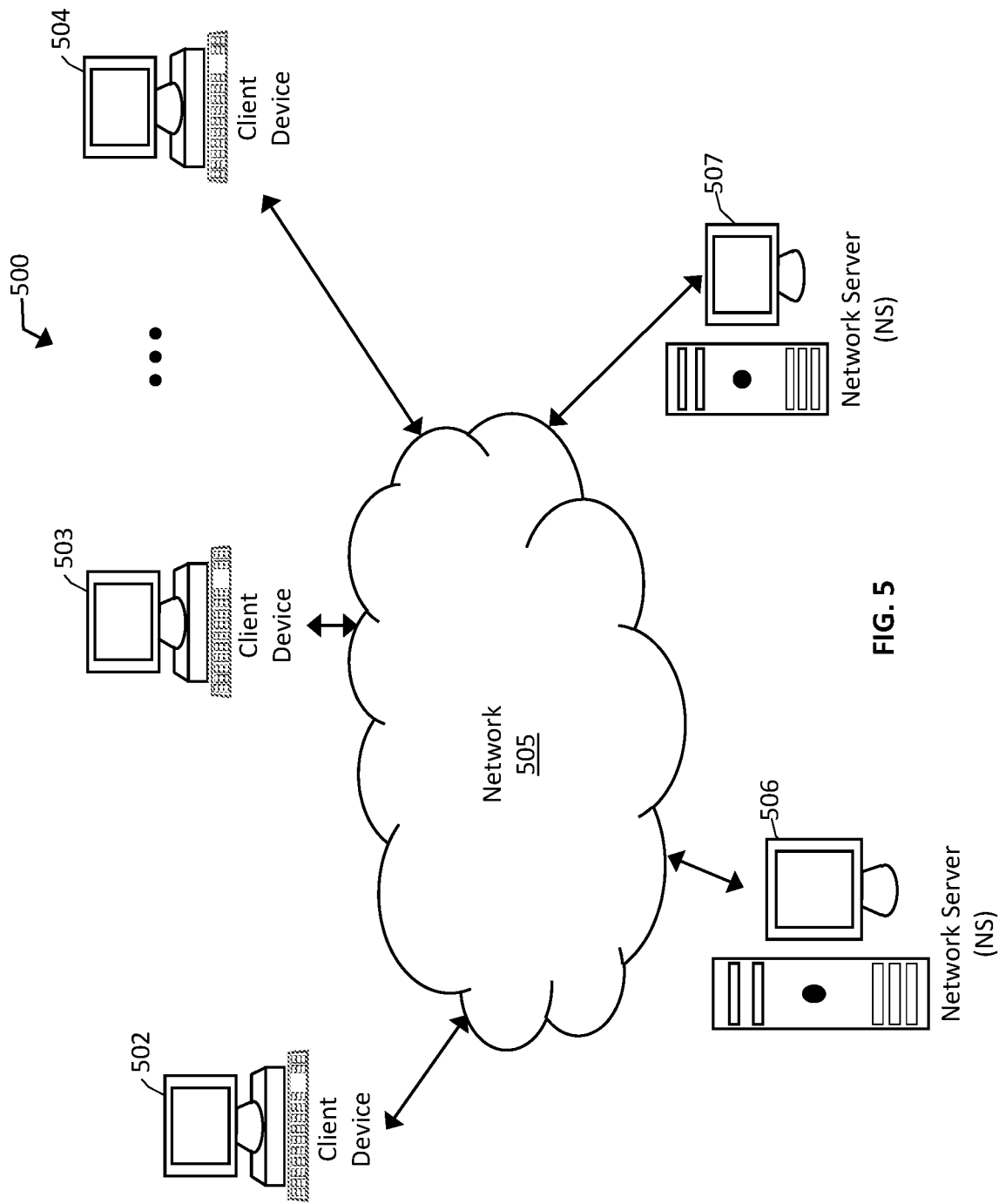

FIG. 5 depicts a block diagram of an example computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the example inventive computing devices and/or the example inventive computing components of the example computer-based system/platform 500 may be configured to manage a large number of members and/or concurrent transactions, as detailed herein. In some embodiments, the example computer-based system/platform 500 may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 502-504 (e.g., clients) of the example computer-based system/platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like on which a user may be notified of balance-related changes to accounts. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an example specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, games, and/or generating balance-related notifications via vibration patterns, as described above.

In some embodiments, the example network 505 may provide network access, data transport and/or other services to any computing device coupled to it. In some embodiments, the example network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the example network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the example network 505 may include and implement, as an alternative or in conjunction with one or more of the above, a WiMAX architecture defined by the WiMAX forum. In some embodiments and, optionally, in combination of any embodiment described above or below, the example network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the example network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the example network 505 may also include mass storage, such as network attached storage (NAS), a storage area network (SAN), a content delivery network (CDN) or other forms of computer or machine readable media.

In some embodiments, the example server 506 or the example server 507 may be a web server (or a series of servers) running a network operating system, examples of which may include but are not limited to Microsoft Windows Server, Novell NetWare, or Linux. In some embodiments, the example server 506 or the example server 507 may be used for and/or provide cloud and/or network computing. Although not shown in FIG. 5, in some embodiments, the example server 506 or the example server 507 may have connections to external systems like email, SMS messaging, text messaging, ad content providers, etc. Any of the features of the example server 506 may be also implemented in the example server 507 and vice versa.

In some embodiments, one or more of the example servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more example computing member devices 502-504, the example server 506, and/or the example server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
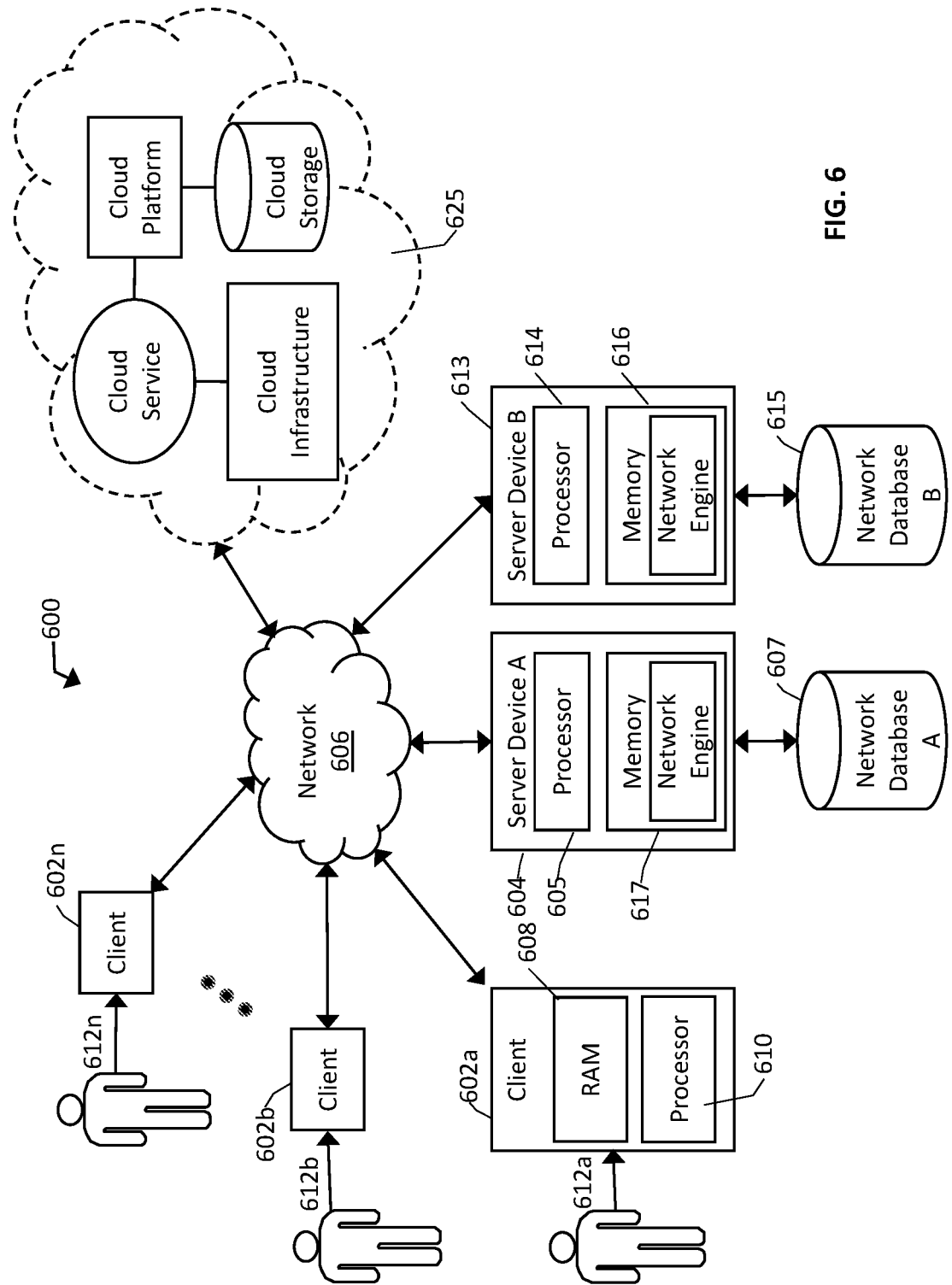

FIG. 6 depicts a block diagram of another example computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, a speaker, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the example network 606 with each other and/or with other systems and/or devices coupled to the network 606. As shown in FIG. 6, example server devices 604 and 613 may be also coupled to the network 606. In some embodiments, one or more member computing devices 602a through 602n may be mobile clients.

In some embodiments, at least one database of example databases 607 and 615 may be any type of database, including a database managed by a database management system (DBMS). In some embodiments, an example DBMS-managed database may be specifically programmed as an engine that controls organization, storage, management, and/or retrieval of data in the respective database. In some embodiments, the example DBMS-managed database may be specifically programmed to provide the ability to query, backup and replicate, enforce rules, provide security, compute, perform change and access logging, and/or automate optimization. In some embodiments, the example DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the example DBMS-managed database may be specifically programmed to define each respective schema of each database in the example DBMS, according to a particular database model of the present disclosure which may include a hierarchical model, network model, relational model, object model, or some other suitable organization that may result in one or more applicable data structures that may include fields, records, files, and/or objects. In some embodiments, the example DBMS-managed database may be specifically programmed to include metadata about the data that is stored.

Figure 7:
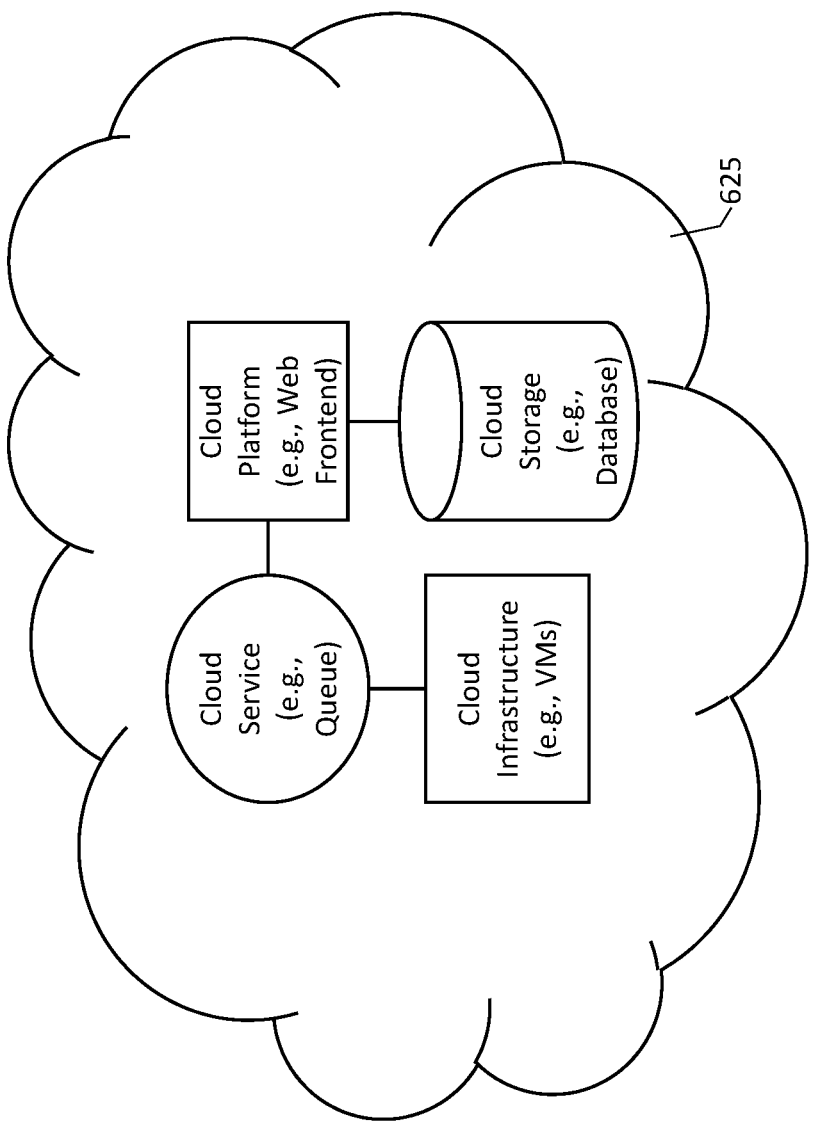
Figure 8:
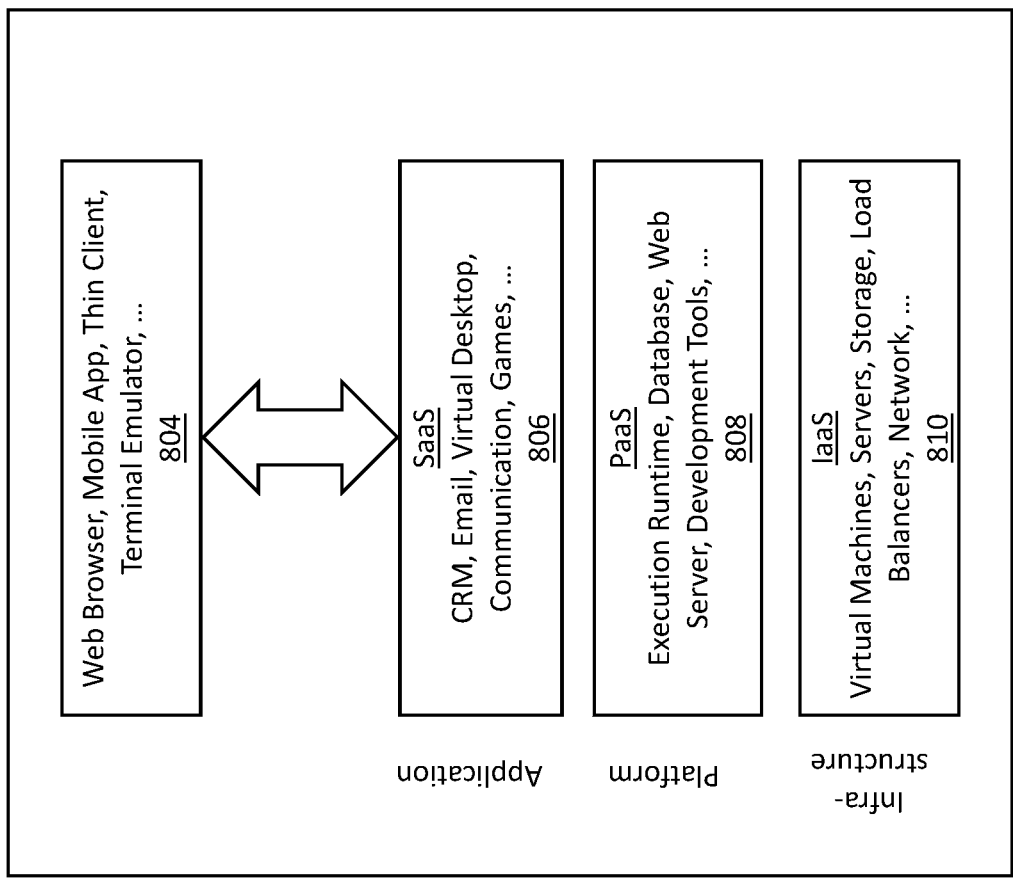

In some embodiments, the example inventive computer-based systems/platforms, the example inventive computer-based devices, and/or the example inventive computer-based components of the present disclosure may be specifically configured to operate in an cloud computing/architecture such as, but not limiting to: infrastructure a service (IaaS), platform as a service (PaaS), and/or software as a service (SaaS). FIGS. 7 and 8 illustrate schematics of example implementations of the cloud computing/architecture(s) in which the example inventive computer-based systems/platforms, the example inventive computer-based devices, and/or the example inventive computer-based components of the present disclosure may be specifically configured to operate.

While one or more embodiments of the present disclosure have been described, it is understood that these embodiments are examples only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
detecting, by at least one processor, an account transaction from an account activity initiation device causing a balance-related change in at least one account associated with at least one user;
determining, by the at least one processor, a transaction quantity and a transaction type associated with the account transaction causing the balance-related change;
generating, by at least one processor, at least one account activity-related vibration pattern, based, at least in part, on the at least one balance-related change, the transaction quantity and the transaction type;
wherein the at least one account activity-related vibration pattern comprises a sequence of vibrations having a time-varying vibration frequency to convey each of the at least one balance-related change, the transaction quantity and the transaction type;
generating, by the at least one processor, at least one vibration encoding based on the at least one account activity-related vibration pattern;
wherein the at least one vibration encoding is configured to be utilized by at least one vibration motor of at least one computing device associated with the at least one user to cause the at least one computing device to vibrate in accordance with the at least one account activity-related vibration pattern;
wherein the at least one vibration encoding comprises a notification update period defining how often to cause the at least one computing device to vibrate according to the at least one account activity-related vibration pattern until a next balance-related change; and
transmitting, by the at least one processor, the at least one vibration encoding to the at least one computing device associated with the at least one user to cause the at least one vibration motor of the at least one computing device associated with the at least one user to vibrate in accordance with the at least one account activity-related vibration pattern in each notification update period until a next balance-related change.

2. The method of claim 1, wherein the at least one balance-related change relates to a limit.

3. The method of claim 2, wherein the at least one balance-related change results in a balance of the at least one account exceeding the limit.

4. The method of claim 1, wherein the at least one balance-related change relates to a threshold associated with a limit.

5. The method of claim 4, wherein the at least one balance-related change results in a balance of the at least one account exceeding the threshold.

6. The method of claim 4, wherein the threshold associated with the limit is a percentage of the limit.

7. The method of claim 2, wherein the limit is set by the at least one user.

8. The method of claim 1,
wherein the set of account activity-related vibration patterns comprises:
i) a first account activity-related vibration pattern that comprises a first number of vibrations and corresponds to a first balance-related change that results in a balance of the at least one account being below a first threshold;

ii) a second account activity-related vibration pattern that comprises a second number of vibrations and corresponds to a second balance-related change that results in the balance of the at least one account being below a second threshold and not below the first threshold; and iii) a third account activity-related vibration pattern that comprises a third number of vibrations and corresponds to a third balance-related change that results in the balance of the at least one account being below a third threshold and not below the second threshold.

9. The method of claim 8,
wherein the first threshold is a first percentage of a limit set by the at least one user, the second threshold is a second percentage of the limit, and the third threshold is the limit.

10. The method of claim 8,
wherein the first threshold, the second threshold and the third threshold relate to a credit limit of the at least one account or to a limit set by the at least one user.

11. The method of claim 1,
wherein each account activity-related vibration pattern of the set of account activity-related vibration patterns comprises at least one respective vibration having variations to a respective pitch and a respective tone over time.

12. The method of claim 1, further comprising:
causing, by the at least one processor, to display a vibration-pattern defining graphical user interface (GUI) on a screen of the at least one computing device associated with the at least one user;
wherein the vibration-pattern defining GUI is configured to allow the at least one user to define the at least one account activity-related vibration pattern of the set of account activity-related vibration patterns for the at least one balance-related change in the at least one account.

13. The method of claim 11, further comprising:
causing, by the at least one processor, to display a vibration-pattern defining graphical user interface (GUI) on a screen of the at least one computing device associated with the at least one user;
wherein the vibration-pattern defining GUI is configured to allow the at least one user to define the respective pitch and the respective tone of the at least one respective vibration of each account activity-related vibration pattern of the set of account activity-related vibration patterns.

14. The method of claim 2,
causing, by the at least one processor, to display a vibration-pattern defining graphical user interface (GUI) on a screen of the at least one computing device associated with the at least one user;
wherein the vibration-pattern defining GUI is configured to allow the at least one user to set (a) the limit, (b) one or more thresholds associated with the limit, or both (a) and (b).

15. The method of claim 1, wherein the at least one account activity-related vibration pattern from the set of account activity-related vibration patterns represents a coded message that describes the at least one balance-related change.

16. The method of claim 1, further comprising:
generating, by the at least one processor, at least one account activity-related audible alert instruction based, at least in part, on the at least one balance-related change; and transmitting, by the at least one processor, the at least one activity-related audible alert instruction to the at least one computing device associated with the at least one user to cause at least one speaker of the at least one computing device to produce at least one activity-related audible alert.

17. A method comprising:
receiving, by at least one processor of a computing device associated with a user, at least one balance-related change in at least one account associated with the user;
determining, by the at least one processor, a change quantity and a change type associated with the at least one balance-related change;
generating, by at least one processor, at least one account activity-related vibration pattern, based, at least in part, on the at least one balance-related change, the transaction quantity and the transaction type;
wherein the at least one account activity-related vibration pattern comprises a sequence of vibrations having a time-varying vibration frequency to convey each of the at least one balance-related change, the transaction quantity and the transaction type;
generating, by the at least one processor, at least one vibration encoding based on the at least one account activity-related vibration pattern;
wherein the at least one vibration encoding is configured to cause at least one vibration motor of the computing device to vibrate in accordance with the at least one account activity-related vibration pattern;
wherein the at least one vibration encoding comprises a notification update period defining how often to cause the at least one computing device to vibrate in according with the at least one account activity-related vibration pattern until a next balance-related change; and
causing, by the at least one processor, the at least one vibration motor of the computing device to vibrate in accordance with the at least one account activity-related vibration pattern in each notification update period until a next balance-related change.

18. The method of claim 17, wherein the at least one balance-related change relates to a limit.

19. The method of claim 18, wherein the at least one balance-related change results in a balance of the at least one account exceeding the limit.

20. The method of claim 17, wherein the at least one balance-related change relates to a threshold associated with a limit.

21. The method of claim 20, wherein the at least one balance-related change results in a balance of the at least one account exceeding the threshold.

22. The method of claim 18, wherein the limit is set by the user.

23. A method comprising:
generating, by at least one processor, at least one account activity-related vibration pattern, based, at least in part, on at least one balance-related change, a change quantity associated with the at least one balance-related change and a change type associated with the at least one balance-related change;
wherein each account activity-related vibration pattern of the set of account activity-related vibration patterns comprises a number of vibrations;
wherein the at least one account activity-related vibration pattern comprises a sequence of vibrations having a time-varying vibration frequency to convey each of the at least one balance-related change, the change quantity and the change type;

generating, by the at least one processor, at least one vibration encoding based on the at least one account activity-related vibration pattern;

wherein the at least one vibration encoding is configured to be utilized by at least one vibration motor of at least one computing device associated with the at least one user to cause the at least one computing device to vibrate in accordance with the at least one account activity-related vibration pattern;

wherein the at least one vibration encoding comprises a notification update period defining how often to cause the at least one computing device to vibrate in according with the at least one account activity-related vibration pattern until a next balance-related change; and transmitting, by the at least one processor, the at least one vibration encoding to the at least one computing device associated with the at least one user to cause the at least one vibration motor of the at least one computing device associated with the at least one user to vibrate in accordance with the at least one account activity-related vibration pattern in each notification update period until a next balance-related change.

24. A method comprising:

generating, by at least one processor, at least one account activity-related vibration pattern, based, at least in part, on at least one balance-related change, a change quantity associated with the at least one balance-related change and a change type associated with the at least one balance-related change;

wherein each account activity-related vibration pattern of the set of account activity-related vibration patterns comprises a number of vibrations;

wherein the at least one account activity-related vibration pattern comprises a sequence of vibrations having a time-varying vibration frequency to convey each of the at least one balance-related change, the change quantity and the change type;

generating, by the at least one processor, at least one vibration encoding based on the at least one account activity-related vibration pattern;

wherein the at least one vibration encoding is configured to be utilized by at least one vibration motor of at least one computing device associated with the at least one user to cause the at least one computing device to vibrate in accordance with the at least one account activity-related vibration pattern;

wherein the at least one vibration encoding comprises a notification update period defining how often to cause the at least one computing device to vibrate in according with the at least one account activity-related vibration pattern until a next balance-related change; and causing, by the at least one processor and using the at least one vibration encoding, the at least one vibration motor of the at least one computing device associated with the at least one user to vibrate in accordance with the at least one account activity-related vibration pattern in each notification update period until a next balance-related change.

25. The method of claim 24, wherein the at least one balance-related change relates to a limit.

26. The method of claim 25, wherein the at least one balance-related change results in a balance of the at least one account exceeding the limit.

27. The method of claim 24, wherein the at least one balance-related change relates to a threshold associated with a limit.

28. The method of claim 27, wherein the at least one balance-related change results in a balance of the at least one account exceeding the threshold.

29. The method of claim 25, wherein the limit is set by the at least one user.

30. The method of claim 24, wherein the set of account activity-related vibration patterns comprises:

i) a first account activity-related vibration pattern that comprises a first number of vibrations and corresponds to a first balance-related change that results in a balance of the at least one account being below a threshold; and ii) a second account activity-related vibration pattern that comprises a second number of vibrations and corresponds to a second balance-related change that results in the balance of the at least one account not being below the threshold.

* * * * *